(12) United States Patent
Talkowski

(10) Patent No.: US 8,609,770 B2
(45) Date of Patent: Dec. 17, 2013

(54) POLYESTERS MODIFIED BY A COMBINATION OF IONOMER AND ORGANIC ACID SALTS

(75) Inventor: Charles John Talkowski, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 734 days.

(21) Appl. No.: 12/358,835

(22) Filed: Jan. 23, 2009

(65) Prior Publication Data

US 2009/0192268 A1      Jul. 30, 2009

Related U.S. Application Data

(60) Provisional application No. 61/023,220, filed on Jan. 24, 2008.

(51) Int. Cl.
    *C08F 8/00*     (2006.01)
(52) U.S. Cl.
    USPC ........................................................ 525/176
(58) Field of Classification Search
    USPC ............... 525/165, 170, 329.5; 524/394, 397, 524/321, 513, 522, 523
    See application file for complete search history.

(56) References Cited

U.S. PATENT DOCUMENTS

| | | | | |
|---|---|---|---|---|
| 4,010,222 | A * | 3/1977 | Shih | 525/176 |
| 4,187,358 | A | 2/1980 | Kyo | |
| 4,753,980 | A | 6/1988 | Deyrup | |
| 4,912,167 | A | 3/1990 | Deyrup | |
| 5,091,478 | A | 2/1992 | Saltman | |
| 5,128,404 | A * | 7/1992 | Howe | 524/456 |
| 5,498,650 | A | 3/1996 | Flexman | |
| 5,554,120 | A * | 9/1996 | Chen et al. | 604/96.01 |
| 6,245,844 | B1 * | 6/2001 | Kurian et al. | 524/396 |
| 6,943,214 | B2 | 9/2005 | Flexman | |
| 7,354,973 | B2 | 4/2008 | Flexman | |
| 7,381,772 | B2 | 6/2008 | Flexman | |
| 2003/0083435 | A1 | 5/2003 | Ichikawa et al. | |
| 2004/0242803 | A1 | 12/2004 | Ohme | |
| 2005/0112372 | A1 * | 5/2005 | Rolland et al. | 428/364 |
| 2005/0151296 | A1 | 7/2005 | Obuchi | |
| 2006/0030678 | A1 * | 2/2006 | Brown et al. | 525/437 |
| 2007/0179246 | A1 * | 8/2007 | Fan | 525/165 |

FOREIGN PATENT DOCUMENTS

| | | |
|---|---|---|
| JP | 2004 083656 A | 3/2004 |
| JP | 2004 189977 A | 7/2004 |
| JP | 2004-300376 A | 10/2004 |
| JP | 2006-290952 A1 | 10/2006 |
| JP | 2614200 B2 | 1/2009 |
| WO | 8503718 A1 | 8/1985 |
| WO | 2004101642 A1 | 11/2005 |
| WO | 2006/086334 A1 | 8/2006 |
| WO | 2007089644 A2 | 8/2007 |

OTHER PUBLICATIONS

Wakabayashi, K; Register, R.; American Physical Society, Annual APS March Meeting 2003, Mar. 3-7, 2003, abstract #N17.004.*
Wakabayashi, K.; Register, R.; Polymer, 2006(47), p. 2874-2883.*
Mohanty, S.; Nando, G.B.; Polymer, 1997(38), p. 1395-1402.*
Carraher, C.E. Jr; Polymer Chemistry, Sixth Edition, 2003, p. 49-53.*
Yamaguchi, Enhanced Strain Hardening in Elongational Viscosity for HDPE/Crosslinked HDPE Blend. II. Processability of Theremoforming. J. Appl. Polym Sci. vol. 86, 79-83 (2002).
Baird, The role of extensional rheology in polymer processing, Korea-Australia J., vol. 11, No. 4, 305-311, Dec. 1999.

* cited by examiner

*Primary Examiner* — Robert Jones, Jr.

(57) ABSTRACT

Disclosed is a thermoplastic composition comprising a poly (trimethylene terephthalate) and about 0.2 to about 30 weight % of a modifier comprising organic acid and an ionomer derived from an ethylene acid copolymer in which the combined acid moieties of the organic acid and acid copolymer are at least partially neutralized with cations of magnesium, calcium, zinc, or a combination thereof.

19 Claims, No Drawings

POLYESTERS MODIFIED BY A COMBINATION OF IONOMER AND ORGANIC ACID SALTS

This application claims priority to U.S. provisional application Ser. No. 61/023,220, filed Jan. 24, 2008; the entire disclosure of which is incorporated herein by reference.

This invention relates to poly(trimethylene terephthalate) or poly(tetramethylene terephthalate) composition, shaped article therewith, and method for reducing melt viscosity of poly(trimethylene terephthalate) or poly(tetramethylene terephthalate) composition.

BACKGROUND OF THE INVENTION

Thermoplastic polymers are commonly used to manufacture various shaped articles that may be utilized in applications such as automotive parts, food containers, signs, and packaging materials. Shaped articles may be prepared from polyester by a number of melt extrusion processes known in the art, such as injection molding, compression molding, blow molding, and profile extrusion.

The most common polyester currently used is polyethylene terephthalate (PET). Due to recent trends toward sustainability and reduced use of petroleum, alternatives to PET are being investigated. Poly(trimethylene terephthalate), herein abbreviated 3GT, also referred to as PTT or polypropylene terephthalate, may be useful in many materials and products in which polyesters such as PET are currently used, for example molded articles. 3GT has properties including a semi-crystalline molecular structure.

British Patent 578097 disclosed the synthesis of 3GT in 1941. 3GT may be prepared using 1,3-propanediol derived from petroleum sources or from biological processes using renewable resources ("bio-based" synthesis). The ability to prepare 3GT from renewable resources makes it an attractive alternative to PET. 3GT produced from renewable sources of 1,3-propanediol is commercially available from E.I. du Pont de Nemours and Company (DuPont) under the tradename SORONA. DuPont pioneered a way to produce the 1,3-propanediol from renewable resources including corn sugar.

The melt viscosity or intrinsic viscosity (IV) of 3GT varies depending on how it is prepared and is roughly correlated to the molecular weight. Previous applications often used 3GT polymerized to lower IV. This approach may lead to low impact performance (impact resistance), and has critical moisture requirements because of the low molecular weight of the polymer. The low IV resins are predominantly used in glass-reinforced materials, which to some degree mitigate the effect of low IV on impact performance.

Use of reinforcements may lead to higher viscosity, poor surface gloss, and poor scratch and mar resistance and other esthetic effects. The increased interest in 3GT as a replacement for PET is prompting the use of 3GT in applications that do not permit the use of reinforcing materials. These applications using unreinforced 3GT may have problems with inadequate impact resistance and/or moisture concerns when 3GT with lower IV is used.

Another polyester of interest is poly(tetramethylene terephthalate), herein abbreviated 4GT, also referred to as PBT or polybutylene terephthalate.

Compositions comprising poly(trimethylene terephthalate) and a thermoplastic polyester have been disclosed (e.g., JP2614200, JP2004-300376 and JP2006-290952).

Monofunctional organic acids are known to interchange with polyester, leading to lower molecular weight polymers. Similarly, salts of organic acids are known to cause molecular weight loss.

Using higher viscosity polyester may improve impact resistance, but the high viscosity may lead to processing difficulties. Higher viscosity polymers may decompose at higher temperatures and may have thermal limits that preclude viscosity reduction by operating at very high temperatures.

Toughening (increased impact resistance) may also be useful for articles prepared from the compositions. Toughening polyester has been achieved using an ionomer modifier, an epoxide-containing copolymer such as ethylene/n-butyl acrylate/glycidyl methacrylate (EBAGMA) (e.g., WO85/03718, WO2007/089644, and U.S. Pat. No. 5,091,478). See also, JP2614200, JP2004-300376, and JP2006-290952.

Methods to lower viscosity and thereby improve injection molding of 3GT compositions, while simultaneously maintaining as much "bio-based" content as possible, are desirable. Increasing toughness and/or impact resistance is also desirable.

SUMMARY OF THE INVENTION

The invention provides a thermoplastic composition comprising, consisting essentially of, or prepared from, based on the weight of the thermoplastic composition, about 70 to about 99.8% of a polyester and a modifier wherein the polyester is poly(trimethylene terephthalate) or poly(tetramethylene terephthalate);

the modifier comprises at least one aliphatic, monofunctional organic acid, at least one ionomer derived from an ethylene acid copolymer, and optionally at least one ethylene ester copolymer;

the organic acid has 4 to 36 carbon atoms, optionally substituted with a $C_{1-8}$ alkyl group;

the ethylene acid copolymer comprises copolymerized comonomers of ethylene, a copolymerized comonomers of at least one $C_{3-8}$ α,β-ethylenically unsaturated carboxylic acid, and optionally a copolymerized comonomer of at least one $C_{3-8}$ α,β-ethylenically unsaturated carboxylic acid ester;

the ethylene ester copolymer wherein comprises, based on the weight of the ethylene ester copolymer, (i) about 20 to about 95% of copolymerized units of ethylene, (ii) 0 to about 25% of copolymerized units of at least one ester of the formula $CH_2=C(R^1)CO_2R^2$, and (iii) 0 to about 80 weight % of copolymerized units of at least one ester of the formula $CH_2=C(R^3)CO_2R^4$; (ii) and (iii) cannot both be 0 weight %; $R^1$ is hydrogen or an alkyl group having 1 to 6 carbon atoms; $R^2$ is a glycidyl group; $R^3$ is hydrogen or an alkyl group having 1 to 8 carbon atoms; and $R^4$ is an alkyl group having 1 to 8 carbon atoms;

from about 75% to about 100% of the combined acid moieties in the modifier are neutralized to form salts with metal cations; and the cations comprise at least about 75 equivalent % of magnesium, calcium, zinc, or combination thereof.

Optionally, the longest carbon chain of the acid is substituted with 1-3 substituents independently selected from $C_1$ to $C_8$ alkyl groups, The ethylene acid copolymer may comprise about 3 to about 35 weight % of $C_{3-8}$ α,β-ethylenically unsaturated carboxylic acid, and 0 to about 30 weight % of $C_{3-8}$ α,β-ethylenically unsaturated carboxylic acid ester.

This invention also provides shaped articles comprising or prepared from the composition described above.

The invention also provides method that can be used for reducing the melt viscosity of a polyester composition, which comprises melt mixing the first 3GT or first 4GT composition with a modifier to provide a final composition wherein the polyester composition and the modifier are each as disclosed above; the final composition comprises, consists essentially of, or consist of, based on the total weight of the final composition, about 70 to about 99.8 weight % of the 3GT or 4GT polymer; about 0.2 to about 30 weight % of the combination of the organic acid and the ethylene acid copolymer; and optionally about 5 to 15 weight % of the ethylene ester copolymer.

The melt viscosity of the final composition may be at least 10% less than that of the 3GT or 4GT polymer composition and the number average molecular weight of the final composition may be at least 85% of that of the 3GT or 4GT polymer composition.

DETAILED DESCRIPTION OF THE INVENTION

Entire disclosures of all references are incorporated by reference.

Tradenames or trademarks are in uppercase.

All percentage is weight %, unless otherwise indicated.

"Copolymer" refers to polymers comprising copolymerized units resulting from copolymerization of two or more comonomers. "Dipolymer" refers to polymers consisting essentially of two comonomer-derived units and "terpolymer" means a copolymer consisting essentially of three comonomer-derived units.

The melt viscosity of 3GT or 4GT polyesters may be lowered by the addition of minor amounts of a combination of magnesium-, zinc- or calcium-containing ethylene acid ionomer and organic acid salt (at levels from 0.2 to 30% for the combination), resulting in higher melt flow. Compared to unmodified 3GT or 4GT, the modified blends have half to a third the melt viscosity. Combinations of ethylene acid ionomers and organic acid salts with sodium or potassium cations increase melt flow, but as a result of reducing the molecular weight of the polyester and accordingly compromising the mechanical properties of the composition. In contrast, magnesium-, zinc- or calcium-containing compositions provide increased melt flow without reducing molecular weight.

3GT polyester blends containing ionomers may be toughened by the addition of ethylene/alkyl acrylate copolymers, ethylene/alkyl acrylate/epoxy copolymers or combinations thereof.

A "3GT homopolymer" means any polymer consisting essentially of repeat units of trimethylene terephthalate and is substantially derived from the polymerization of 1,3-propanediol with terephthalic acid, or derived from the ester-forming equivalents thereof (e.g., any reactants which may be polymerized to ultimately provide a polymer of poly(trimethylene terephthalate).

A "3GT copolymer" means any polymer comprising (or derived from) at least about 80 mole percent trimethylene terephthalate and the remainder of the polymer being derived from monomers other than terephthalic acid and 1,3-propanediol, or their ester forming equivalents. Ester-forming equivalents include diesters such as dimethylterephthalate. Examples of 3GT copolymers include copolyesters synthesized from 3 or more reactants, each having two ester forming groups. For example, a 3GT copolymer (co3GT) may be prepared by reacting 1,3-propanediol, terephthalic acid, and one or more comonomers selected from linear, cyclic, and branched aliphatic dicarboxylic acids having 4 to 12 carbon atoms such as butanedioic acid, pentanedioic acid, hexanedioic acid, azelaic acid, sebacic acid, dodecanedioic acid, 1,4-cyclohexane-dicarboxylic acid, or ester-forming equivalents thereof; aromatic dicarboxylic acids other than terephthalic acid having 8 to 12 carbon atoms such as phthalic acid, isophthalic acid or 2,6-naphthalenedicarboxylic acid; linear, cyclic, and branched aliphatic diols other than 1,3-propanediol having 2 to 8 carbon atoms such as ethanediol, 1,2-propanediol, 1,4-butanediol, or 1,4-cyclohexanediol; and aliphatic and aromatic ether glycols having 4 to 10 carbon atoms such as hydroquinone bis(2-hydroxyethyl) ether. A co3GT may be prepared from a poly(ethylene ether) glycol having a molecular weight below about 460, such as diethylene ether glycol, methoxypolyalkylene glycol, diethylene glycol, and polyethylene glycol. The comonomer may be present in the copolymer at a level of about 0.5 to about 15 mol %, and may be present at a level of up to about 30 mol %.

The 3GT copolymer may comprise other comonomers and such comonomers may be copolymerized into the copolymer chain in minor amounts, e.g., up to about 10 mol %, or up to about 5 mol %. Examples of such other comonomers include functional comonomers such as 5-sodium sulfoisophthalate, which can be in an amount of about 0.2 to about 5 mol %. About 5 mol % or less, or about 2 mol % or less, of trimellitic anhydride, trimellitic acid, pyromellitic dianhydride (pmda), pentaerythritol or other acids or diols that have more than two reactive sites may be incorporated as branching agents to increase the melt viscosity and improve the rheology for coextrusion in multilayer structures. 3GT copolymers may contain at least about 85 mol %, at least about 90 mol %, at least about 95 mol %, or at least about 98 mol %, of copolymerized units of trimethylene terephthalate.

4GT homopolymers and copolymers are similar to 3GT, except that tetramethylene glycol (1,4-butanediol) is used in place of trimethylene glycol in the polymers and are commercially available from DuPont under the tradename CRASTIN or from BASF under the tradename ULTRADUR.

Because 3GT and 4GT polyesters are well known to one skilled in the art, the description of their preparation is omitted for the interest of brevity.

A polymer blend may comprise, for example, at least about 80%, or at least about 90% of 3GT (and/or 4GT) homopolymer or copolymer, based on the total weight of the blend composition. 3GT or 4GT polymer blend may contain up to about 25% of one or more of the other polymers, based on the total weight of the blend. Examples of other polymers may be polyesters prepared from other diols, such as the diols described above.

A 3GT polymer may have an IV ranging from about 0.8 dl/g to about 1.4 dl/g, or about 0.9 dl/g to about 1.1 dl/g, as measured using Goodyear R-103B Equivalent IV Method at a concentration of 0.4 g/dl in 50/50% trifluoroacetic acid/dichloromethane, and a number average molecular weight ($M_n$) ranging from about 19,000 to about 45,000, or about 25,000 to about 30,000.

The acid copolymers may be "direct" or "random" acid copolymers meaning polymers polymerized by adding all monomers simultaneously, as distinct from a graft copolymer, where a monomer is grafted onto an existing polymer, often by a subsequent free radical reaction.

An example of an acid copolymer is E/X/Y copolymer where E represents copolymerized units of ethylene, X represents at least one copolymerized unsaturated carboxylic acid unit as disclosed above, and Y represents copolymerized units of a softening comonomer such as alkyl acrylate, alkyl methacrylate, or combinations thereof. X may be present in the copolymer in amounts ranging from a lower limit of about 12 or 14 to an upper limit of about 19, 20, 22, 25, 30, or 35% of the E/X/Y copolymer. For example, methacrylic acid (MAA) may be present in an amount from about 12 to about 20% while acrylic acid (AA) may be present in an amount from about 12 to about 19%. Y may be present in the copolymer in amounts from 0 to about 28, 0.1 to 28, 0.1 to 10, 5 to 25, or 5 to 15% of the E/X/Y copolymer. E/X dipolymer has 0% of Y and X can be from about 12 to about 20, 25 or 35% of the dipolymer. E/X/Y copolymers can have X from about 12 to about 20% and Y from about 4 to about 25% of the copolymer.

The $C_{3-8}$ α,β-ethylenically unsaturated carboxylic acid may be acrylic acid or methacrylic acid or combinations thereof and the copolymerized comonomers of $C_3$ to $C_8$ α,β-ethylenically unsaturated carboxylic acid esters when present are $C_1$-$C_8$ alkyl esters of acrylic acid or methacrylic acid.

Alkyl acrylates and alkyl methacrylates include alkyl groups having from 1 to 4, or from 3 to 4, carbon atoms such as methyl acrylate, ethyl acrylate, n-butyl acrylate, methyl methacrylate, ethyl methacrylate, and n-butyl methacrylate.

Specific acid copolymers include ethylene/acrylic acid dipolymers; ethylene/methacrylic acid dipolymers; ethylene/acrylic acid/methyl acrylate terpolymers; ethylene/acrylic acid/methyl methacrylate terpolymers; ethylene/methacrylic acid/methyl acrylate terpolymers; ethylene/methacrylic acid/methyl methacrylate terpolymers; ethylene/acrylic acid/ethyl acrylate terpolymers; ethylene/acrylic acid/ethyl methacrylate terpolymers; ethylene/methacrylic acid/ethyl acrylate terpolymers; ethylene/methacrylic acid/ethyl methacrylate terpolymers; ethylene/acrylic acid/n-butyl acrylate terpolymers; ethylene/acrylic acid/n-butyl methacrylate terpolymers; ethylene/methacrylic acid/n-butyl acrylate terpolymers; ethylene/methacrylic acid/n-butyl methacrylate terpolymers; or combinations of two or more thereof The acid copolymers may be produced by any methods known to one skilled in the art such as that disclosed in U.S. Pat. No. 5,028,674. Because such methods are so well known, their description is omitted herein for the interest of brevity. The acid copolymers include those commercially available from DuPont under the tradename NUCREL.

Ethylene/acrylic acid dipolymers and ethylene/acrylic acid/alkyl acrylate terpolymers are of note because acrylic acid may provide more acid moieties than an equal weight of methacrylic acid. Mixtures of acid copolymers may be used.

Melt processable ionomers may be prepared from acid copolymers described above by methods known in the art for preparing ionomers. They include partially neutralized acid copolymers, particularly copolymers prepared from copolymerization of ethylene and acrylic acid or methacrylic acid. The ionomers may be neutralized by metal-containing bases to any level that does not result in an intractable (not melt processable) polymer that does not have useful physical properties, for example, at least about 15% or at least about 20%, about 15 to about 70%, about 20 to about 70%, or about 40 to about 70% of the acid moieties of the acid copolymer are neutralized to form salts with sodium, magnesium, calcium or zinc cations, or combinations of such cations.

Unmodified ionomers include those commercially available from DuPont under the tradename SURLYN. Unmodified ionomers comprising magnesium, zinc or calcium cations may be used to prepare the ionomer modifier composition by mixing with organic acids or salts thereof and optionally further neutralizing as described below. Unmodified ionomers containing sodium cations may be mixed with the 3GT polyester modified with the ionomer modifier composition as described below.

Organic acids can include, without limitation, aliphatic, monofunctional organic acids having 4 to 36 carbon atoms, optionally substituted with from one to three substituents independently selected from $C_1$ to $C_8$ alkyl groups. The organic acids may be saturated or unsaturated, and, if unsaturated, may include more than one carbon-carbon double bond. "Monofunctional" refers to acids with one carboxylic acid moiety. The suitable organic acids include $C_4$ to $C_{36}$ (for example $C_{18}$), $C_6$ to $C_{26}$, $C_6$ to $C_{11}$, or $C_{11}$ to $C_{16}$ acids.

Specific examples of suitable organic acids include, but are not limited to, caproic acid, caprylic acid, capric acid, lauric acid, stearic acid, isostearic acid, behenic acid, montanic acid, erucic acid, oleic acid, iso-oleic acid, and linoleic acid. Naturally-derived organic fatty acids such as palmitic, stearic, oleic, erucic, behenic acids, or combinations of two or more thereof.

Commercial grades of organic acids may include a number of structurally different organic acids of varying lesser amounts. Therefore, a composition that comprises a named acid may also include other acids that are present in commercial grades of the named acid, at levels that are proportional to their levels in the commercial grade.

Saturated acids include stearic acid, montanic acid and behenic acid. Unsaturated linear organic acids include oleic acid and erucic acid. The longest carbon chain of the acid may be substituted with from one to three $C_1$ to $C_8$ alkyl substituents such as methyl. Of note are saturated, branched organic acids wherein the longest carbon chain of the acid is substituted with one $C_{1-8}$ alkyl group and an organic acid that is branched and saturated, having from 6 to 24 carbon atoms, such as iso-stearic acid. The $C_{18}$ saturated branched organic acid, "iso-stearic acid," is also known as iso-octadecanoic acid.

While it may be useful for the organic acids (and salts) to have a low volatility when being melt-blended with the acid copolymer or ionomer, volatility has been found to not be limiting when preparing blends with high nominal neutralization levels, particularly near or above 100%. At above 100% nominal neutralization (i.e., sufficient basic compound is added such that all acid moieties in the copolymer and organic acid are nominally neutralized) or greater, volatility simply is no longer an issue. As such, organic acids with lower carbon content may be used. It is preferred, however, that the organic acid (or salt) be non-volatile and non-migratory. By non-volatile, it is meant that they do not volatilize at temperatures of melt blending of the agent with the acid copolymer. By non-migratory, it is meant that the acid does not bloom to the surface of the polymeric article under normal storage conditions at ambient temperatures.

The organic acids may present in the modifier in a range having a lower limit of about 5% to an upper limit of about 60%, about 30 to about 50%, or about 35 to about 45% of the modifier combination (these amounts are based on the amount of organic acid added to the combination in its non-neutralized or free-acid form).

The salts of the organic acids may be any of a wide variety, particularly including the zinc, magnesium or calcium salts of the organic acids. Magnesium salts or calcium salts are preferred.

The organic acid salt and ionomer combination may be added to the 3GT or 4GT polyester as individual components, or may be prepared as described below and the combination then added to the polyester. When added as individual components, the organic acid salt may be added to the polyester in from about 0.1 to about 15% and the ionomer may be added to the polyester in about 0.1 to about 15% such that the combination of organic acid salt and ionomer is present in the polyester composition in about 0.2 to about 30%.

Of note are 3GT or 4GT polyester compositions in which the combination of organic acid salt and ionomer is present in a range from a lower limit of about 0.2, 0.5 or 1 to an upper limit of about 5, about 10, about 15, about 20 or about 30% of the total composition.

Modifier may be produced by heating a mixture of the ethylene acid copolymer(s) or ionomer(s), the organic acid(s) or salt thereof, and at least one basic compound capable of neutralizing the combined acid moieties of the acid copolymer and the organic acid. For example, the components of the composition may be mixed by (a) melt-blending ethylene $\alpha,\beta$-ethylenically unsaturated $C_{3-8}$ carboxylic acid copolymer(s) or ionomer(s) thereof as described above that are not neutralized to the level that they have become intractable (not melt-processible) with one or more organic acids as described above or salts thereof, and concurrently or subsequently (b) adding a sufficient amount of a basic compound capable of neutralization of the combined acid moieties (including those in the acid copolymer and in the organic acid), to nominal neutralization levels of about 75% to about 100% (or higher).

Treatment of acid copolymers and organic acids with basic compounds (concurrently or subsequently), without the use of an inert diluent, may prepare the final composition without loss of processibility which would result in loss of melt processibility for the 100% neutralized ionomer alone. For example, an acid copolymer blended with organic acid(s) may be nominally neutralized to at least 100% without losing melt processibility. In addition, nominal neutralization to at least 100% reduces the volatility of the organic acids.

The acid copolymer(s) or unmodified, melt-processible ionomer(s) may be melt-blended with the organic acid(s) or salt(s) and other polymers in any manner known in the art, such as melt-mixing. For example, a twin-screw extruder may be used to mix the acid copolymer and the organic acid and treat with the basic compound at the same time. It is desirable that the mixing is conducted so that the components are intimately mixed, allowing the basic compound to neutralize the acidic moieties in the other components.

The amount of basic metal compound may be provided by adding the stoichiometric amount of the basic compound calculated to neutralize a target amount of acid moieties in the acid copolymer and organic acid(s) in the blend (herein referred to as "% nominal neutralization" or "nominally neutralized"). Thus, sufficient basic compound is made available in the blend so that, in aggregate, the indicated level of nominal neutralization could be achieved.

Basic compounds can include formates, acetates, nitrates, oxides, hydroxides or alkoxides of the ions of alkaline earth metals and transition metals. Examples include formate, acetate, hydroxide, oxide, alkoxide, etc. of magnesium or calcium.

The basic compounds may be added neat to the acid copolymer or ionomer thereof and the organic acid or salt thereof. The basic compound may also be premixed with a polymeric material, such as an acid copolymer, to form a "masterbatch" that may be added to the acid copolymer or ionomer thereof and the organic acid or salt thereof. Of note is a masterbatch comprising about 40 to 60% of a copolymer of ethylene, acrylic acid or methacrylic acid, and optionally an alkyl acrylate wherein the alkyl group has from 1 to 4 carbon atoms; and about 40 to 60% of a basic compound as described above (e.g., $Mg(OH)_2$).

It is desirable to run the blending/neutralization process with an extruder equipped with a vacuum port to remove any excess volatiles including moisture. Moisture may have a negative impact on subsequent molding operations in that excess moisture and volatiles may create unwanted foaming and voids in the molded article.

Neutralization can provide the overall salt of the composition comprises at least about 75, at least about 80%, at least about 90, or even 100%, equivalent % magnesium, calcium or zinc cations, based on the total salts present in the composition.

Polyester may be nucleated to improve crystallinity and heat resistance. For example, U.S. Pat. No. 6,245,844 discloses 3GT nucleated with a monosodium salt of a dicarboxylic acid selected from monosodium terephthalates, monosodium naphthalene dicarboxylates, and monosodium isophthalates. Suitable nucleation agents also include sodium salts of $C_{10}$ to $C_{36}$ (e.g., $C_{18}$ to $C_{36}$, or $C_{30}$ to $C_{36}$) monofunctional organic acids, such as sodium stearate, sodium behenate, sodium erucate, sodium palmitate, sodium montanate, or combinations of two or more thereof. "Monofunctional" refers to acids with one carboxylic acid moiety. Nucleated polyesters such as nucleated 3GT may have crystallization temperatures up to 50° C. higher than that of the non-nucleated polyester. An example of a nucleator is the sodium salt of montanic acid, commercially available under the tradename LICOMONT NaV101 from Clariant.

About 0.005 to about 1% of a nucleating agent, either a monosodium salt of a dicarboxylic acid selected from monosodium terephthalates, monosodium naphthalene dicarboxylates, monosodium isophthalates, or a sodium salt of a $C_{10}$ to $C_{36}$ monofunctional organic acid, can be included to the compositions. Higher molar levels, than those disclosed, of sodium salts of organic acids may lead to reduced molecular weight which reduces melt viscosity, but leads to inferior mechanical properties. Shorter-chain acid salts require lower amounts by weight to minimize molecular weight reduction. Of note is a composition as described herein comprising about 0.1 to about 1% of a nucleator, for example a sodium salt of a $C_{30}$ to $C_{36}$ monofunctional organic acid.

Nucleated polyester containing mono-sodium terephthalate or a sodium salt of a $C_{10}$ to $C_{36}$ monofunctional organic acid exhibit short crystallization half times and early onsets of crystallization as measured by differential scanning calorimeter (DSC) in the heating and cooling cycle. These are desirable effects because the nucleated polymers may quickly become rigid, leading to faster demold times and shorter cycle times in processing the polymers into shaped articles by such methods as thermoforming, injection molding, and blow molding. In addition, polyester polyester containing monosodium terephthalate exhibited significant improvement in brittleness, heat resistance, and impact resistance over the non-nucleated polyester.

In contrast to 3GT polymers, 4GT polymers are normally sufficiently crystalline that they do not need to be nucleated to provide suitable high temperature performance.

Toughening polyester may be achieved using an ionomer modifier, or a combination of ionomer and an epoxide-containing copolymer such as EBAGMA copolymers or ethylene/glycidyl methacrylate (EGMA) copolymers. The modifiers provided increased toughness and lower flex modulus, but the melt viscosity of the blends was increased, which is undesirable for some molding applications. Other tougheners useful in the compositions described herein include ethylene/alkyl acrylate copolymers or ethylene/alkyl methacrylate copolymers.

Use of the modifier combination may reduce the viscosity of polyester compositions, including those toughened with epoxide-containing copolymers, non-epoxide-containing copolymers or combinations of both.

When the composition comprises ethylene ester copolymer toughener(s), the ionomer/organic acid salt combination may be about 0.2 to about 15% based on the combination of (a) and (b).

The ethylene ester copolymers may also be created by graft-copolymerization of the ester comonomer onto a previously polymerized ethylene copolymer. The comonomer copolymerized with ethylene can be selected from the group consisting of methyl acrylate, ethyl acrylate, n-butyl acrylate, glycidyl methacrylate and combinations of two or more thereof.

The ethylene ester copolymer may comprise, based on the total weight of the ethylene ester copolymer, about 60 to about 95%, about 60 to about 90%, or about 70 to about 90%, of ethylene; about 0.5 to about 25%, about 2 to about 20%, or about 3 to about 17%, of ester comonomer of formula (iii); and up to about 40%, about 3 to about 70%, about 3 to about 40%, about 15 to about 35%, or about 20 to about 35%, of ester comonomer of formula (iii).

Specific examples of the ethylene ester copolymers include dipolymers produced by the copolymerization of ethylene and an alkyl acrylate or alkyl methacrylate such as methyl acrylate, ethyl acrylate or butyl acrylate (EBAGMA and EGMA). Additional comonomers may be present as copolymerized units in the ethylene copolymers. For example, the ethylene ester copolymers may additionally comprise other comonomers such as carbon monoxide. When present, copolymerized units of carbon monoxide may comprise up to about 20%, or about 3 to about 15% of the weight of the ethylene ester copolymer.

The ethylene ester copolymers may be prepared by any suitable process. In particular, the ethylene ester copolymers may be prepared by polymerization of the foregoing monomers in the presence of a free-radical polymerization initiator at elevated temperatures (e.g., about 100° C. to about 270° C. or about 130° C. to about 230° C.) and elevated pressures (e.g., at least about 70 MPa or about 140 to about 350 MPa) and the polymerization may be carried out by a) a batch process in a conventional autoclave, or b) a continuous process in a series of autoclaves or a multi-zoned autoclave or a tubular reactor (see, e.g., U.S. Pat. Nos. 3,350,372, 3,756,996, 5,532,066, 5,543,233, and 5,571,878). The ethylene ester copolymers may be homogeneous or not. For example, the ethylene ester copolymers may not be homogeneous in terms of concentration of comonomer units along the polymer chain due to imperfect mixing during polymerization or variable monomer concentrations during the course of the polymerization.

The ethylene ester copolymer can be selected from the group consisting of ethylene/methyl acrylate dipolymer, ethylene/ethyl acrylate dipolymer, ethylene/n-butyl acrylate dipolymer, ethylene/glycidyl methacrylate dipolymer, ethylene/n-butyl acrylate/glycidyl methacrylate terpolymer, ethylene/n-butyl acrylate/carbon monoxide terpolymer and combinations of two or more thereof.

Ethylene/glycidyl methacrylate dipolymers can include those comprising about 0.5 to about 25%, or about 2 to about 20,% of glycidyl methacrylate. Ethylene/n-butyl acrylate/ glycidyl methacrylate terpolymers can include those comprising about 0.5 to about 25 or about 2 to about 20% of glycidyl methacrylate, and about 3 to about 40% of n-butyl acrylate.

An ethylene/alkyl acrylate copolymer can comprise from about 20 to about 30% of methyl acrylate as the alkyl acrylate component. Suitable ethylene/alkyl acrylate copolymers, for example, comprise 24%, 25% or 30% of methyl acrylate. Ethylene/alkyl acrylate copolymers are commercially available from DuPont under the ELVALOY AC tradename. Other ethylene alkyl acrylate copolymers may also be suitable.

Any physical forms, such as pellets, of 3GT or 4GT may be used. After being optionally blended or coated with any desired additives by, e.g., drying mixing to produce a mixture, the mixture can be further blended with a nucleating agent, preferably by melt blending such as with an extruder. The blending temperature, e.g., barrel temperature of an extruder barrel, may be raised from a cold feed to about 250° C. to about 265° C. and the mixture may be conveyed forward to a mixing zone near the front end of the extruder. The mixing zone may have kneading blocks for mixing to provide a well dispersed mixture. The extrudate may be quenched in a water bath and the cut into pellets. The pellets may be dried and tested for melt viscosity and molded into articles.

The modified 3GT or 4GT compositions may optionally include from about 1 to about 30% of other (unmodified) ionomers containing sodium cations. Addition of sodium ionomers to 3GT polyester in combination with the magnesium, calcium or zinc-containing organic acid modified ionomer may provide desirable combinations of physical properties. For example, melt viscosity of the modified 3GT composition may be adjusted to a desired level by employing a mixture of sodium ionomer and magnesium organic acid modified ionomer. Tensile properties such as elongation to break and modulus may also be affected. Higher crystallization temperatures of the modified 3GT composition may be maintained by using a sodium ionomer and the magnesium organic acid modified ionomer.

Of note are optional sodium ionomers of E/X dipolymers wherein X is from about 12 to about 20, 25 or 35% of the dipolymer. These ionomers may be useful in providing compositions exhibiting strain hardening in stress-strain tests discussed below, particularly when added in at least 15% of the total composition. Also of note are optional sodium ionomers of E/X/Y copolymers wherein X is from about 3 to about 12% and Y is from about 4 to about 25% of the copolymer.

The compositions may additionally comprise from 0.001 to 15%, or from 0.01 to 10%, of the total composition, of one or more additives including plasticizers, stabilizers including viscosity stabilizers and hydrolytic stabilizers, primary and secondary antioxidants (e.g., hindered phenols characterized as phenolic compounds that contain sterically bulky radicals in close proximity to the phenolic hydroxyl group or IRGANOX 1010), ultraviolet ray absorbers and stabilizers, antistatic agents, dyes, pigments or other coloring agents, fire-retardants, lubricants, processing aids, slip additives, antiblock agents such as silica or talc, release agents, and/or mixtures thereof. Additional optional additives may include inorganic fillers; acid copolymer waxes, such as for example Honeywell wax AC540; $TiO_2$, which is used as a whitening agent; optical brighteners; surfactants; and other components known in the art to be useful additives. These additives are described in the *Kirk Othmer Encyclopedia of Chemical Technology*. Of note is a composition as described herein comprising about 0.1 to about 1% of an antioxidant.

Waxes used as processing aids are low molecular weight (less than about 10,000 daltons), low melting materials. Of note is a composition as described herein comprising about 0.1 to about 1% of wax.

3GT or 4GT polyesters may also contain inorganic fillers such as glass fibers, talc, and/or other mineral reinforcements to increase the stiffness and heat resistance of the compositions.

The optional incorporation of these additives into the compositions may be carried out by any known process, for example, by dry blending, extruding a mixture of the various constituents, the conventional masterbatch technique, or the like.

A film may be made from the composition by melt-processing using known processes such as co-extrusion, sheet extrusion, extrusion casting, extrusion coating, thermal lamination, blown film methods, or any known processes. Because the processes for making films are well known to one skilled in the art, the description is omitted herein for the interest of brevity.

The compositions may be useful for molding small and/or thin-walled articles. The thin-walled articles may be about 0.5 mm to about 1 mm thick, or thicker.

The toughened compositions are useful for high-sheer, high-throughput injection molding applications. Molded articles may be produced from a composition disclosed above, by virtually any method of extrusion processing known to those skilled in this art. For example, a melt extrusion process such as injection molding, coinjection molding, compression molding, overmolding or profile extrusion may be used. As such, the articles may be injection molded, compression molded, profile extruded or the like. Injection molded articles are of note. In addition, the shaped articles may comprise material other than the modified polyester, such as layers of polymeric material other than the modified polyester including the presence of tie (adhesive) layers and the like, or nonpolymeric substrates. For example, articles may be prepared by coinjection molding wherein two melt streams are injected into a mold in such a way that one polymer (often, the more expensive and/or more functional polymer) is on the exterior of the article while the lower cost, lower performing polymer is in the interior.

One or more additives disclosed above may be present in the respective layers.

Various injection-molded articles may be prepared including small household items and parts for machinery and vehicles. Household and personal items include combs and other hair setting and styling utensils, other personal care utensils, eyeglass frames, telephones, computer housings, keypads and mouse units, writing utensils, flatware, calculators, cameras, pails, garbage containers, game boards and pieces, toys, credit cards, and furniture, and tool handles. Machine and vehicle parts such as steering wheels, handles, knobs, and the like may be prepared. Containers and caps may also be prepared from the modified 3GT resin.

Molded articles include caps or closures comprising a composition disclosed above. Caps may be compression molded or injection molded. Such caps may be used to close and seal a wide variety of containers for beverages (e.g., carbonated soft drinks and pasteurized beverages); foods (e.g., oxygen sensitive ones such as mayonnaise, peanut butter and salad oil, and including corrosive ones such as vinegar, lemon juice); and household chemicals (e.g., bleaches, detergents, personal hygiene products, medicaments, drugs, cosmetics, petroleum products, and other products).

Containers include bowls, trays, cups, cans, buckets, tub, boxes, vials, bottles, vials, jars and other containers may be prepared, for example, by injection molding.

Another example of a shaped article is a profile. Profiles have a particular shape and by their process of manufacture known as profile extrusion. Profiles are not film or sheeting, and thus the process for making profiles does not include the use of calendering or chill rolls. Profiles are also not prepared by injection molding processes. Because profile processing is well known, the description of which is omitted herein for the interest of brevity.

Overmolding of a substrate such as a metal insert, shaped polymeric part or combination thereof with the modified 3GT or 4GT polyester also produces shaped articles comprising an outer layer of the modified 3GT or 4GT polyester. Alternatively, the 3GT or 4GT composition as described herein may be used as a substrate that may be overmolded with other polymeric materials. Because overmolding is well known, the description of which is omitted herein for the interest of brevity.

Articles prepared from 4GT polymers may include one or more belts, boards, automobile parts and electronic or electrical connectors; the automobile part includes air bag plug, automobile lighting hardware, auto lamp sockets and bases, auto air intake duct, or combinations of two or more thereof; the electrical or electronic part includes one or more electrical or electronic connectors or capacitors used under the hood of an automobile or electrical relay component, relay base, relay case, ignition system component, or combinations of two or more thereof. The methods described above for preparation of 3GT articles are also useful in preparing 4GT articles.

EXAMPLES

The Examples are illustrative and are not to be construed as to unduly limit the scope of the invention.

Materials Used

3GT-1: A 3GT homopolymer available commercially under the tradename SORONA from DuPont.

4GT-1: A 4GT homopolymer available commercially under the tradename CRASTIN 6131 from DuPont.

M-1: a blend of 60% of an ethylene/acrylic acid/n-butyl acrylate terpolymer (8.5% AA and 15.5% n-BA) and 40% of magnesium stearate, neutralized to about 100% with magnesium.

M-2: a blend of 60% of an ethylene/methacrylic acid dipolymer (19% MAA) and 40% of sodium stearate, neutralized to about 100% with sodium.

M-3: a blend of 70% of an ethylene/acrylic acid/n-butyl acrylate terpolymer (6.2% AA and 28% n-BA) with MI of 210 g/10 min. and 30% of sodium behenate, neutralized to about 100% with sodium.

I-1: an ethylene/methacrylic acid dipolymer (15% MAA), neutralized with Na (59%), MI of 0.9 g/10 min.

I-2: an ethylene/methacrylic acid dipolymer (15% MAA), neutralized with Zn (58%), MI of 0.7 g/10 min.

I-3: an ethylene/methacrylic acid dipolymer (19% MAA), neutralized with 2.5 weight % $Mg(OH)_2$, MI of 1.1 g/10 min.

I-4: an ethylene/methacrylic acid terpolymer (9% MAA, 23% of n-butyl acrylate), neutralized with Na (52%), MI of 1.0 g/10 min.

EMA-1: an ethylene/methyl acrylate dipolymer (30% MA), MI of 3 g/10 min.

EBAGMA-1: a terpolymer of 70% of ethylene/25% of n-butyl acrylate/5% of glycidyl methacrylate.

Nuc-1: sodium montanate obtained from Clariant under the tradename LICOMONT NaV101.

AO-1: bis-(2,4-di-t-butylphenyl)pentaerythritol diphosphite antioxidant available from Chemtura under the tradename ULTRANOX 626.

Wax: processing wax available commercially as AC Wax 16A, (Honeywell, Morristown, N.J.).

MgSt: Magnesium stearate, commercial grade.

Pellets of 3GT-1 homopolymer, coated with antioxidant AO-1 and nucleator Nuc-1 and dried to give pellets of Comparative Example C2, or the dried 3GT-1 pellets were shaken with powders of AO-1 and Nuc-1 to provide the dry-coated pellets. The dried pellets of 3GT-1 homopolymer, coated with antioxidant and nucleator, were added to the back end of a W & P twin screw extruder along with pellets of the modifier(s). The barrel temperature of the extruder barrels was raised from a cold feed to about 250° C. and the pellets conveyed forward to a mixing zone near the front end of the extruder. The mixing zone had kneading blocks to mix the ingredients and the zone had a "reverse" element to create a seal between the extruder barrel and the extruder screw elements. The reverse element pumped the melt momentarily backwards. The seal allowed vacuum to be applied at the next barrel section so that volatiles were removed. The barrel temperatures were then dropped to about 240° C. and the die was also set to that temperature range. This provided a well dispersed mixture, with melt temperature of around 255 to 265° C. The compositions that were prepared are summarized in Table 1A and 1B wherein the amounts are reported in weight %.

Ingredients were fed to twin screw extruder and the strand extrudate was quenched in a water bath and the strand was cut into pellets. The pellets were dried and tested for viscosity, crystallization behavior and molded using an Arburg injection molding machine. D1708 tensile bars were made and used in stress/strain measurements.

Melt rheology was measured on a piston rheometer (Dynisco Capillary Rheometer, Model LCR 7000) run at constant temperature (260° C.), with samples having from 100 to 150 ppm moisture. Sample pellets were introduced into the chamber, thermally equilibrated and melted for six minutes. Pressure was applied to the pellets to eliminate air pockets. After six minutes force was applied to the pellets to achieve a series of selected shear rates and the force required to achieve the shear rate was measured and the resultant melt viscosity determined. Table 3 reports the melt viscosity at 1000 sec$^{-1}$.

As summarized in Table 3, compositions comprising 3GT-1 and various modifiers were prepared and their Mn, Mw and Mz were measured using column chromatography according to standard protocols used in molecular weight determinations. Mn is the number average molecular weight; Mw is the weight average molecular weight and Mz is the z "moment" average molecular weight.

TABLE 1A

| Example | 3GT-1 | Nuc-1 | AO-1 | I-1 | I-2 | I-3 | I-4 | M-1 | M-2 | M-3 | MgSt | Wax |
|---|---|---|---|---|---|---|---|---|---|---|---|---|
| 1 | 96.4 | 0.5 | 0.1 | 0 | 0 | 0 | 0 | 3 | 0 | 0 | 0 | 0 |
| 2 | 79.5 | 0.5 | 0 | 0 | 0 | 0 | 0 | 20 | 0 | 0 | 0 | 0 |
| 3 | 88.4 | 0.5 | 0.1 | 0 | 0 | 10 | 0 | 1 | 0 | 0 | 0 | 0 |
| 4 | 86.4 | 0.5 | 0.1 | 10 | 0 | 0 | 0 | 3 | 0 | 0 | 0 | 0 |
| 5 | 76.4 | 0.5 | 0.1 | 20 | 0 | 0 | 0 | 3 | 0 | 0 | 0 | 0 |
| 6 | 76.3 | 0.5 | 0.2 | 15 | 15 | 0 | 0 | 3 | 0 | 0 | 0 | 0 |
| 7 | 97.9 | 0.5 | 0.1 | 0 | 0 | 0 | 0 | 1 | 0 | 0 | 0 | 0.5 |
| 8 | 78.8 | 0.5 | 0.2 | 0 | 0 | 0 | 0 | 20 | 0 | 0 | 0 | 0.5 |
| 9 | 78.9 | 0.5 | 0.1 | 0 | 0 | 0 | 0 | 20 | 0 | 0 | 0 | 0.5 |
| 10 | 77.9 | 0.5 | 0.1 | 0 | 0 | 0 | 20 | 1 | 0 | 0 | 0 | 0.5 |
| 11 | 78.8 | 0.5 | 0.2 | 0 | 0 | 0 | 19 | 1 | 0 | 0 | 0 | 0.5 |

TABLE 1B

| Example | 3GT-1 | Nuc-1 | AO-1 | I-1 | I-2 | I-3 | I-4 | M-1 | M-2 | M-3 | MgSt | Wax |
|---|---|---|---|---|---|---|---|---|---|---|---|---|
| C1 | 100 | 0 | 0 | 0 | 0 | 0 | 0 | 0 | 0 | 0 | 0 | 0 |
| C2 | 99.4 | 0.5 | 0.1 | 0 | 0 | 0 | 0 | 0 | 0 | 0 | 0 | 0 |
| C3 | 79.4 | 0.5 | 0.1 | 20 | 0 | 0 | 0 | 0 | 0 | 0 | 0 | 0 |
| C4 | 89.4 | 0.5 | 0.1 | 0 | 0 | 10 | 0 | 0 | 0 | 0 | 0 | 0 |
| C5 | 98.4 | 0.5 | 0.1 | 0 | 0 | 0 | 0 | 0 | 1 | 0 | 0 | 0 |
| C6 | 96.4 | 0.5 | 0.1 | 0 | 0 | 0 | 0 | 0 | 3 | 0 | 0 | 0 |
| C7 | 89.4 | 0.5 | 0.1 | 0 | 0 | 0 | 0 | 0 | 0 | 10 | 0 | 0 |
| C8 | 86.4 | 0.5 | 0.1 | 0 | 0 | 0 | 0 | 3 | 10 | 0 | 0 | 0 |
| C9 | 98.9 | 0.5 | 0.1 | 0 | 0 | 0 | 0 | 0 | 0 | 0 | 0.5 | 0 |
| C10 | 0 | 0 | 0 | 0 | 0 | 0 | 0 | 100 | 0 | 0 | 0 | 0 |
| C11 | 98.8 | 0.5 | 0.2 | 0 | 0 | 0 | 0 | 0 | 0 | 0 | 0 | 0.5 |

Additional examples were prepared using modifier M-1 and ethylene ester copolymers as summarized in Table 2.

TABLE 2

| Example | 3GT-1 | Nuc-1 | AO-1 | M-1 | EMA-1 | EBAGMA-1 |
|---|---|---|---|---|---|---|
| C12 | 89.4 | 0.5 | 0.1 | 0 | 5 | 5 |
| 12 | 93.4 | 0.5 | 0.1 | 1 | 5 | 0 |
| 13 | 88.4 | 0.5 | 0.1 | 1 | 10 | 0 |
| 14 | 84.4 | 0.5 | 0.1 | 10 | 0 | 5 |
| 15 | 74.4 | 0.5 | 0.1 | 20 | 0 | 5 |
| 16 | 69.4 | 0.5 | 0.1 | 20 | 0 | 10 |
| 17 | 84.9 | 0 | 0.1 | 10 | 0 | 5 |
| 18 | 79.4 | 0.5 | 0.1 | 10 | 0 | 10 |
| 19 | 88.4 | 0.5 | 0.1 | 1 | 5 | 5 |

TABLE 3

| Example | Melt Viscosity (Pa · sec) at 1000 sec$^{-1}$ | Mw | Mn | Mz |
|---|---|---|---|---|
| C1 | 145 | 49,930 | 23,140 | 75,870 |
| C2 | 140-150 | 46,430 | 23,500 | 69,900 |
| C3 | 175-215 | | | |
| C4 | 183 | | | |
| C5 | 118 | 41,340 | 19,860 | 62,410 |
| C6 | 89 | 39,460 | 19,600 | 59,200 |
| C7 | 58 | 27,680 | 13,830 | 42,360 |
| C8 | 52 | 35,790 | 18,060 | 53,310 |
| C9 | 57 | 46,910 | 22,070 | 71,210 |
| C10 | 118 | | | |
| 1 | 33 | 43,630 | 19,750 | 67,500 |

TABLE 3-continued

| Example | Melt Viscosity (Pa · sec) at 1000 sec$^{-1}$ | Mw | Mn | Mz |
|---|---|---|---|---|
| 2 | 25 | 48,000 | 23,600 | 74,200 |
| 3 | 36 | | | |
| 4 | 30-60 | 45,010 | 23,120 | 66,370 |
| 5 | 60 | | | |
| 6 | 89 | | | |
| C11 | 111 | | | |
| 7 | 65 | 47,510 | 22,920 | 72,210 |
| 8 | 19 | | | |
| 9 | 30 | | | |
| 10 | 123 | 48,300 | 24,250 | 72,310 |
| 11 | — | | | |
| C12 | 148 | | | |
| 12 | 83 | | | |
| 13 | 60 | | | |
| 14 | 77 | | | |
| 15 | 95 | | | |
| 16 | 98 | | | |
| 17 | 41 | | | |
| 18 | 25 | | | |
| 19 | 100 | | | |

Addition of unmodified ionomers to 3GT-1 has minimal effect on viscosity at low addition levels (for example, the melt viscosity for a composition with 1% of I-1 is 146, and with 2% of I-1 is 149), but 10 to 20% of unmodified ionomers raises the melt viscosity, as demonstrated by Comparative Examples C3 and C4. Organic acid salt modified ionomers with sodium cations provided lower melt viscosity but significantly reduced molecular weight (Comparative Examples C5, C6 and C7 and C8). Without being bound by theory, the relatively large amount of sodium organic acid salt in these Comparative Examples may have led to the molecular weight reduction. Magnesium stearate modified 3GT-1, Comparative Example C9, provided reduced viscosity without significantly reducing molecular weight, but provided incomplete crystallization on cooling a sample (see below).

The Examples, compositions of the invention, show that organic acid salt modified ionomers with non-sodium (for example Mg) cations provide lower melt viscosity without significantly reducing molecular weight or significantly reducing crystallization temperature. The reduction of melt viscosity provided by the Examples is greater than would be expected by an arithmetic combination of the melt viscosities of Comparative Example C2 and Comparative Example C10.

Addition of the organic acid salt modified ionomers to blends containing unmodified sodium ionomers also lowers viscosity (Compare Comparative Example C3 with Examples 4, 5 and 6 and Comparative Example C4 with Example 3.

Use of a wax modifier (Comparative Example C11) also reduced melt viscosity, but provided poor elongation at break (see below). Elongation at break was improved when an organic acid salt modified ionomer with magnesium cations was added, while maintaining low melt viscosity (Examples 8 and 9).

The extent of crystallization of modified 3GT-1 samples was measured according to the following procedure. Crystallization exotherm measurements were conducted on a TA Instruments (New Castle, Del.) Model Q1000 and operated on about 5 to 10 mg of sample. The polymer sample was melted in a standard DSC test, heating the sample to 260° C. at 10° C./minute. The sample was then cooled at 10° C./minute and reheated to 260° C. at 10° C./minute. If the polymer is cooled from the melt, and the DCS trace shows an exotherm peak on subsequent heating, the sample is not fully crystallized. This peak is a crystallization peak of the polymer that did not crystallize as the original melt was cooled. DSC traces for the Examples in Table 4 showed no exotherm peaks on first or second DSC heat cycles (except Sample C9), indicating they were crystallized fully on cooling at this rate (10° C./minute). Sample C9 showed such a peak at about 70° C. of 30 J/gm heat content, indicating quenching (incomplete crystallization) during the cooling process.

TABLE 4

| Example | Crystallization* |
|---|---|
| C1 | 158 |
| C2 | 200 |
| 4 | 203 |
| 5 | 203 |
| 6 | 193 |
| C11 | 202 |
| 8 | 184 |
| 9 | 184 |
| 10 | 199 |
| 11 | 199 |
| C12 | 202 |
| 12 | 196 |
| 13 | 186 |
| 19 | 182.5 |
| C9 | 184 |

*DSC temperature at maximum point on the exotherm curve on cooling from melt temperature of 260° C., with cooling rate of 10° C./minute.

Tensile tests may be done at a temperature (about 90° C.) above the glass transition point (Tg) of the composition but below its melting point, to evaluate potential thermoforming capability. Compositions suitable for thermoforming desirably have functionality requirements such as strain hardening at elevated temperature (above Tg) (i.e., the final strength is greater than yield strength) exhibit an increase in tensile modulus greater than the yield (of about 2000 psi), such that with further elongation, the tensile values exceed the yield point tensile values. Thermoformable compositions also desirably have fast crystallization and a high onset of crystallization temperature on cooling from the melt. This allows the formed sheet to be extensively crystallized so subsequent heating above the Tg (to about 90° C.) does not induce significant additional crystallization, which may cause distortion of the sheet prior to thermoforming.

Tensile strength and elongation at break were measured according to ASTM D1708 and summarized in Table 5 (90° C. Stress-Strain).

TABLE 5

| Example | Modulus at 100% | Modulus at 200% | Modulus at 300% | Modulus at break | Elongation at break (%) | elongation at max tensile (%) |
|---|---|---|---|---|---|---|
| 4 | | | | 3995 | 15 | 15 |
| 5 | 3220 | 3230 | 3870 | 4115 | 350 | 350 |
| 6 | | strain hardening | | | 335 | 335 |
| C11 | | | | 4955 | 17 | 17 |

TABLE 5-continued

| Example | Modulus at 100% | Modulus at 200% | Modulus at 300% | Modulus at break | Elongation at break (%) | elongation at max tensile (%) |
|---|---|---|---|---|---|---|
| 8 | 2120 | 2700 | 3445 | 4020 | 455 | 455 |
| 10 | | no strain hardening | | | 255 | 20 |
| 11 | | no strain hardening | | | 255 | 20 |
| 12 | | no strain hardening | | | 180 | 20 |
| 13 | | no strain hardening | | | 205 | 18 |

Comparative Example C11 in the 90° C. tensile test showed maximum tensile strength of 4955 psi at 17% elongation, elongation at break was 17. DSC test showed maximum exotherm on the cooling curve at 202° C. It showed good crystallization behavior, but had very poor elongation and no strain hardening. Example 4, with 3% of the modifier combination and 10% of sodium ionomer also showed no strain hardening. Examples 10 and 11 contained a sodium ionomer based on a low acid ethylene acid copolymer (less than 12% methacrylic acid) and showed no strain hardening. Examples 12 and 13 contained ethylene/methyl acrylate copolymer but no additional ionomer and also did not show strain hardening. However, Examples 5 and 6, with 3% of the modifier combination and at least 15% of sodium ionomer(s) based on low acid ethylene acid copolymers (more than 12 wt % methacrylic acid) did show strain hardening. Example 8 also showed strain hardening.

Notched Izod tests were conducted according to ASTM procedure D256 and ISO 180. Gardner Impact measurements were conducted according to ASTM procedures D4226, D5420 and D5628.

TABLE 6

| Example | Gardner impact (inch-lb) | Notched Izod (ft-lb/in) |
|---|---|---|
| C2 | 32 | 0.4 to 0.5 |
| C5 | 40 | |
| C6 | 16 | |
| C9 | 40 | |
| C10 | 88 | |
| 7 | 40 | |
| C12 | 104 | 0.9 |
| 12 | 128 | |
| 13 | 178 | |
| 14 | 320* | |
| 15 | 320* | |
| 16 | 320* | |
| 17 | 320* | |
| 18 | 320* | |
| 19 | 120 | 1.1 |

*Highest value possible using the test conditions.

Compositions modified with the ionomer organic acid salt combination show good impact strength as demonstrated by Gardner impact tests. Compositions that also include EBAGMA-1 showed excellent impact strength.

Pellets of 4GT-1 homopolymer were melt blended with antioxidant AO-1 and pellets of the modifier(s) in a W & P twin screw extruder to provide well dispersed mixtures. The compositions that were prepared are summarized in Table 7 wherein the amounts are reported in weight %.

TABLE 7

| Example | 4GT-1 | AO-1 | M-1 | EMA-1 | EBAGMA-1 |
|---|---|---|---|---|---|
| C13 | 99.9 | 0.1 | 0 | 0 | 0 |
| 20 | 84.9 | 0.1 | 10 | 0 | 5 |
| 21 | 79.9 | 0.1 | 10 | 5 | 5 |

The compositions were processed into test samples and tested as described above for the 3GT compositions. Test results are summarized in Table 8.

TABLE 8

| Example | Melt Viscosity (Pa · sec) at 1000 sec$^{-1}$ | Notched Izod (ft-lb/in) |
|---|---|---|
| C13 | 134 | 0.5 |
| 20 | 48 | 1.05 |
| 21 | 64 | 1.42 |

Examples 20 and 21, containing the modifier combination and ethylene ester copolymer tougheners, provided lower melt viscosity and greater toughness than Comparative Example C13.

While certain of the preferred embodiments of the invention have been described and specifically exemplified above, it is not intended that the invention be limited to such embodiments. Various modifications may be made without departing from the scope and spirit of the invention, as set forth in the following claims.

The invention claimed is:

1. An article comprising a thermoplastic composition which comprises or is produced from, based on the weight of the thermoplastic composition, about 70 to about 99.8% of a polyester composition and a modifier wherein
   the article is selected from the group consisting of a household item, part for machinery and vehicle, container cap or closure, profile, and overmolded article;
   the household item is selected from the group consisting of a comb, hair setting and styling utensil, personal care utensil, eyeglass frame, telephone, computer housing, keypad, mouse unit, writing utensil, flatware, calculator, camera, pail, garbage container, game board and piece, toy, credit card, furniture handle, and tool handle;
   the part for machine and vehicle is selected from the group consisting of a steering wheel, handle, knob, belt, board, electronic or electrical connector; air bag plug, lighting hardware, auto lamp socket and bases, and auto air intake duct;
   the container includes a bowl, tray, cup, can, bucket, tub, box, vial, bottle, vial, and jar;
   the polyester composition comprises poly(trimethylene terephthalate) or poly(tetramethylene terephthalate), or combinations thereof;
   the modifier comprises at least one aliphatic, monofunctional organic acid, at least one ionomer derived from an ethylene acid copolymer, and optionally at least one ethylene ester copolymer;
   the organic acid has 4 to 36 carbon atoms, optionally substituted with a $C_{1-8}$ alkyl group;
   the ethylene ester copolymer wherein comprises, based on the weight of the ethylene ester copolymer, (i) about 20 to about 95% of copolymerized units of ethylene, (ii) 0 to about 25% of copolymerized units of at least one ester of the formula $CH_2=C(R^1)CO_2R^2$, and (iii) 0 to about 80 weight % of copolymerized units of at least one ester of the formula $CH_2=C(R^3)CO_2R^4$;

(ii) and (iii) cannot both be 0 weight %; $R^1$ is hydrogen or an alkyl group having 1 to 6 carbon atoms; $R^2$ is a glycidyl group; $R^3$ is hydrogen or an alkyl group having 1 to 8 carbon atoms; and $R^4$ is an alkyl group having 1 to 8 carbon atoms;

from about 75% to about 100% of the combined acid moieties in the modifier are neutralized to form salts with metal cations; and the cations comprise at least about 75 equivalent % of magnesium, calcium, zinc, or combinations of two or more thereof; and wherein the melt viscosity of the thermoplastic composition is at least 10% less than that of the polyester composition without the modifier.

2. The article of claim 1 wherein the organic acid is present in about 5 to about 60 wt % of the modifier;

the acid copolymer comprises, based on the weight of the acid copolymer, about 3 to about 35 weight % of the $C_{3-8}$ α,β-ethylenically unsaturated carboxylic acid, and 0 to about 30 weight % of the $C_{3-8}$ α,β-ethylenically unsaturated carboxylic acid ester, and the remainder being ethylene;

the $C_{3-8}$ α,β-ethylenically unsaturated carboxylic acid is acrylic acid, methacrylic acid, or combinations thereof; and the $C_{3-8}$ α,β-ethylenically unsaturated carboxylic acid ester, when present, is a $C_1$-$C_8$ alkyl ester of acrylic acid or of methacrylic acid.

3. The article of claim 2 wherein the acid copolymer comprises 4 to 25 weight % of $C_{3-8}$ α,β-ethylenically unsaturated carboxylic acid ester.

4. The article of claim 2 wherein the polyester composition is the poly(tetramethylene terephthalate).

5. The article of claim 4 wherein the modifier further comprises about 5 to 15 weight %, based on the weight of the thermoplastic composition, of at least one ethylene ester copolymer selected from the group consisting of ethylene/methyl acrylate dipolymer, ethylene/ethyl acrylate dipolymer, ethylene/n-butyl acrylate dipolymer, ethylene/glycidyl methacrylate dipolymer, ethylene/n-butyl acrylate/glycidyl methacrylate terpolymer, ethylene/n-butyl acrylate/carbon monoxide terpolymer, and combinations of two or more thereof.

6. The article of claim 5 wherein the ethylene ester copolymer is an ethylene/glycidyl methacrylate dipolymer, ethylene/n-butyl acrylate/glycidyl methacrylate terpolymer, or combinations thereof.

7. The article of claim 4 wherein the modifier comprises a combination of an ethylene/alkyl acrylate dipolymer and an ethylene/glycidyl methacrylate dipolymer, an ethylene/n-butyl acrylate/glycidyl methacrylate terpolymer, or combinations thereof.

8. The article of claim 2 wherein the polyester composition comprises the poly(trimethylene terephthalate) and about 0.005 to about 1 weight %, based on the total weight of the thermoplastic composition, of a nucleating agent including a sodium salt of a carboxylic acid.

9. The article of claim 8 wherein the nucleating agent is monosodium terephthalate, monosodium naphthalene dicarboxylate, monosodium isophthalate, a salt of a $C_{30}$ to $C_{36}$ monofunctional organic acid, or combinations of two or more thereof and is present in 0.005 to 1 weight % of the thermoplastic composition.

10. The article of claim 8 wherein the modifier further comprises about 5 to 15 weight %, based on the weight of the thermoplastic composition, of at least one ethylene ester copolymer selected from the group consisting of ethylene/methyl acrylate dipolymer, ethylene/ethyl acrylate dipolymer, ethylene/n-butyl acrylate dipolymer, ethylene/glycidyl methacrylate dipolymer, ethylene/n-butyl acrylate/glycidyl methacrylate terpolymer, ethylene/n-butyl acrylate/carbon monoxide terpolymer, and combinations of two or more thereof.

11. The article of claim 9 the modifier further comprises about 5 to 15 weight %, based on the weight of the thermoplastic composition, of an ethylene/methyl acrylate dipolymer, an ethylene/glycidyl methacrylate dipolymer, ethylene/n-butyl acrylate/glycidyl methacrylate terpolymer, or combinations of two or more thereof.

12. The article of claim 9 wherein the modifier comprises a combination of an ethylene/alkyl acrylate dipolymer and an ethylene/glycidyl methacrylate dipolymer, an ethylene/n-butyl acrylate/glycidyl methacrylate terpolymer, or combinations thereof.

13. The article of claim 12 wherein the modifier further comprises from about 1 to about 30 weight %, based on the weight of the thermoplastic composition, of one or more additional ionomers containing sodium cations.

14. A method comprising melt mixing a first polyester composition with a modifier under a condition effective to produce a second polyester having a melt viscosity at least 10% less than that of the first polyester composition and a number average molecular weight of at least 85% of that of the first polyester composition; and converting the second composition to an article as recited in claim 1 wherein the first polyester composition comprises poly(trimethylene terephthalate) or poly(tetramethylene terephthalate), or combinations thereof;

the modifier comprises at least one aliphatic, monofunctional organic acid, at least one ionomer derived from an ethylene acid copolymer, and optionally at least one ethylene ester copolymer;

the organic acid has 4 to 36 carbon atoms, optionally substituted with a $C_{1-8}$ alkyl group and is present in about 5 to about 60 wt % of the modifier;

the acid copolymer comprises copolymerized comonomers of ethylene, a copolymerized comonomers of at least one $C_{3-8}$ α,β-ethylenically unsaturated carboxylic acid, and optionally a copolymerized comonomer of at least one $C_{3-8}$ α,β-ethylenically unsaturated carboxylic acid ester;

the ethylene ester copolymer wherein comprises, based on the weight of the ethylene ester copolymer, (i) about 20 to about 95% of copolymerized units of ethylene, (ii) 0 to about 25% of copolymerized units of at least one ester of the formula $CH_2=C(R^1)CO_2R^2$, and (iii) 0 to about 80 weight % of copolymerized units of at least one ester of the formula $CH_2=C(R^3)CO_2R^4$;

(ii) and (iii) cannot both be 0 weight %; $R^1$ is hydrogen or an alkyl group having 1 to 6 carbon atoms; $R^2$ is a glycidyl group; $R^3$ is hydrogen or an alkyl group having 1 to 8 carbon atoms; and $R^4$ is an alkyl group having 1 to 8 carbon atoms;

from about 75% to about 100% of the combined acid moieties in the modifier are neutralized to form salts with metal cations; and the cations comprise at least about 75 equivalent % of magnesium, calcium, zinc, or combinations of two or more thereof.

15. The method of claim 14 wherein the first polyester composition comprises the poly(tetramethylene terephthalate) polyester.

16. The method of claim 14 wherein the first polyester composition comprises the poly(trimethylene terephthalate) polyester; the process further comprises melt mixing the first polyester composition with a nucleating agent to produce a nucleated poly(trimethylene terephthalate); and then melt mixing the nucleated poly(trimethylene terephthalate) with the modifier wherein the nucleating agent is monosodium terephthalate, monosodium naphthalene dicarboxylate, monosodium isophthalate, a salt of a $C_{30}$ to $C_{36}$ monofunctional organic acid, or combinations of two or more thereof;

the nucleating agent is present in an effective amount such that is present in the range of from about 0.005 to about 1 weight % in the second polyester composition.

17. The method of claim 14 wherein the modifier comprises the ethylene ester copolymer including an ethylene/methyl acrylate dipolymer, an ethylene/glycidyl methacrylate dipolymer, ethylene/n-butyl acrylate/glycidyl methacrylate terpolymer, or combinations of two or more thereof.

18. The method of claim 15 wherein the modifier comprises the ethylene ester copolymer including an ethylene/methyl acrylate dipolymer, an ethylene/glycidyl methacrylate dipolymer, ethylene/n-butyl acrylate/glycidyl methacrylate terpolymer, or combinations of two or more thereof.

19. The method of claim 16 wherein the modifier comprises the ethylene ester copolymer including an ethylene/methyl acrylate dipolymer, an ethylene/glycidyl methacrylate dipolymer, ethylene/n-butyl acrylate/glycidyl methacrylate terpolymer, or combinations of two or more thereof.

* * * * *